United States Patent [19]

Sawko et al.

[11] 4,061,579
[45] Dec. 6, 1977

[54] INTUMESCENT COATINGS CONTAINING 4,4'-DINITROSULFANILIDE

[75] Inventors: Paul M. Sawko; Salvatore R. Riccitiello, both of San Jose, Calif.

[73] Assignee: The United States of America as represented by the Administrator of the National Aeronautics and Space Administration, Washington, D.C.

[21] Appl. No.: 734,902

[22] Filed: Oct. 22, 1976

[51] Int. Cl.² .......................... C09D 5/18; C09K 3/28
[52] U.S. Cl. .......................... 252/8.1; 60/836
[58] Field of Search .......................... 252/8.1; 260/2 N

[56] References Cited

U.S. PATENT DOCUMENTS

| | | | |
|---|---|---|---|
| 3,702,841 | 11/1972 | Sawko | 260/2.5 F |
| 3,748,154 | 7/1973 | Seipel et al. | 252/8.1 |
| 3,855,134 | 12/1974 | Green et al. | 252/8.1 |
| 3,855,138 | 12/1974 | Roth | 252/8.1 |
| 3,888,819 | 6/1975 | Evans et al. | 252/8.1 |

FOREIGN PATENT DOCUMENTS

| | | | |
|---|---|---|---|
| 2,458,510 | 6/1975 | Germany | 252/8.1 |

OTHER PUBLICATIONS

Journal of Coating Tech. 1977, 49(624), pp. 49-53, Sawko, et al.

Primary Examiner—Joseph L. Schofer
Assistant Examiner—Peter F. Kulkosky
Attorney, Agent, or Firm—Darrell G. Brekke; John R. Manning

[57] ABSTRACT

An intumescent composition, which comprises a mixture of 4,4'-dinitrosulfanilide as the intumescent agent in a polymer binder mixture of a chlorinated polyolefin, a bisphenol A epoxy resin and a rubber-like amine hardener.

10 Claims, 6 Drawing Figures

INTUMESCENT COATINGS CONTAINING 4,4'-DINITROSULFANILIDE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to a composition useful for applications as intumescent coatings. More particularly, the present invention relates to intumescent coatings. More particularly, the present invention relates to intumescent coatings which contain 4,4'-dinitrosulfanilide as the intumescent producing component.

2. Background of the Invention

Many types of intumescent coatings are known which swell or enlarge when heated. A variety of different substrates can be conveniently protected from heat and/or fire by these coatings.

Generally, intumescent coating compositions are formulated from a combination of a variety of constituents which enter into a complex series of reactions when intumesced by heat or fire. Many common compositions contain diammonium phosphate, ammonium phosphate or monoammonium phosphate as catalysts which function by acting as dehydrating acid derivatives, which react with a carbon containing material such as starch or pentaerythritol. The intumescent composition must also contain a resin component such as melamine formaldehyde to act as a binder for the various ingredients. The compositions generally are provided with special blowing agents which release gases for the swelling or foaming action of the coating at the proper decomposition temperature. It is apparent since the intumescent coatings generally contain a variety of constituents, that the sequence of reactions which takes place is dependent on the decomposition temperature of each ingredient which must possess environmental stability in order to function at the proper temperature. The principal problem with the ammonium phosphate containing compositions is that they are sensitive to water in that when water is present it interacts with water soluble components from the composition and therefore adversely affects the intumescent process. Consequently, a low density-swelled char having insulative characteristics cannot be obtained.

Another class of intumescent compositions is formulated upon the bisulfate salts of nitroaniline isomers as the principal ingredient in a binder matrix such as nitrocellulose. Such compositions are disclosed in U.S. Pat. No. 3,843,526. These compositions when applied as a coating produce voluminous chars which can insulate confined areas acting as a void filler. Another similar type of composition is one which contains the bisulfate salt of nitroaniline with a nitrile phenolic binder. With this composition a controlled char with insulating characteristics relative to the substrate can be obtained. However, these types of intumescent compositions, as well as other compositions, suffer deterioration from the environment.

Still another type of intumescent coating is one formulated from a combination of the ammonium salt of 1,4-nitroaniline-2-sulfonic acid and an epoxy-polysulfide copolymer. This composition provides thermal protection to heat sensitive articles such as ordnance with somewhat improved environmental stability.

The chief disadvantage of the intumescent compositions which contain the bisulfate salt of nitroaniline and the ammonium salt of 4-nitroaniline-2-sulfonic acid is that these components intumesce at high temperatures, and in the case of bisulfate salt, the corresponding compositions are not resistant to the environment. On the other hand, however, the ammonium salt of 1,4-nitroaniline-2-sulfonic acid is humidity resistant, but will leach from an applied composition when exposed to direct contact with water.

Another type of intumescent composition as disclosed in U.S. Pat. No. 3,912,845 is formulated from a combination of an amine-aldehyde interpolymer, wherein the amine component is an aminobenzenesulfonamide, with other adjuncts such as plasticizers, stabilizers, dispersing agents, pigments and the like. The intumescent composition disclosed in this patent would have limited long term environmental stability resulting from the free amino groups present within the intumescent compound. Free amino groups also could cause corrosion to metal substrates resulting in poor abhesion.

A need, therefore, continues to exist for an improved intumescent composition which is stable to the environment which intumesces at favorable temperatures and which does not contain water soluble components which can be leached from the composition when subjected to water.

SUMMARY OF THE INVENTION

Accordingly, one object of the present invention is to provide an intumescent composition which is stable to the environment and to exposure to water and which intumesces at a favorable temperature.

Another object of the present invention is to provide a method of protecting various substances from heat and fire with an intumescent composition which is environmentally stable.

Briefly, these objects and other objects of the present invention as hereinafter will become more readily apparent, can be attained by an intumescent composition which is composed of a mixture of 4,4'-dinitrosulfanilide as the intumescent agent in a polymeric binder mixture of a chlorinated polyolefin, a bisphenol A epoxy resin and a rubber-like amine hardener.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
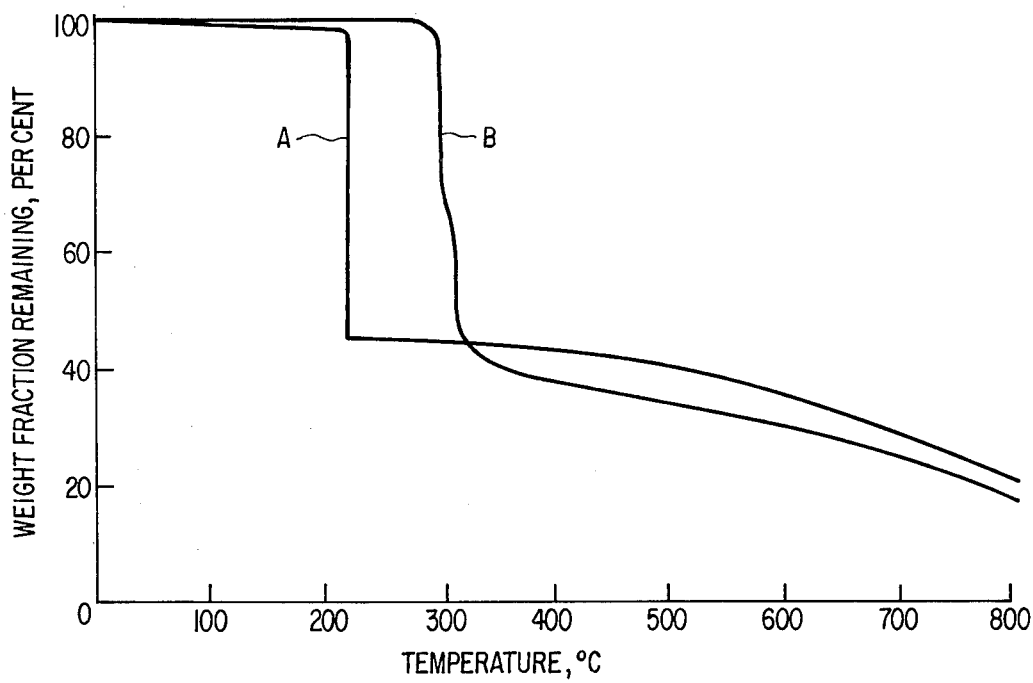
FIG. 1 shows the thermogravimetric analysis of the 4,4'-dinitrosulfanilide intumescent agent of the present invention and the ammonium salt of 1,4-nitroaniline-2-sulfonic acid (a prior art intumescent agent)

The discovery of the present invention is an intumescent composition which forms a practical, tough adherent coating and which intumesces to form a char having insulating characteristics thereby providing thermal protection to a substrate when it is exposed to heat and/or fire. The principal constituents of the present composition are the char or intumescence forming ingredient, 4,4'-dinitrosulfanilide having the formula:

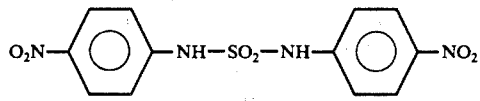

and a polymeric binder system with which the sulfanilide compound is blended. The special intumescent characteristics of 4,4'-dinitrosulfanilide have been established in several ways. From the thermo gravimetric analysis (TGA) data in FIG. 1, (a temperature increase of 3° C/min under nitrogen) it is evident that the sulfanilide compound (curve A) has a lower intumescent temperature (220° C) than the intumescent temperature (300° C) of a somewhat similar compound, the ammonium salt of 1,4-nitroaniline-2-sulfonic acid, (curve B) which as described earlier is a well-known intumescent compound. When heated, the dinitrosulfanilide compound of the present invention exhibits a high char yield of 45% at the intumescent temperature, which is comparable to other nitroaromatic intumescent agents. This property indicates that the dinitrosulfanilide compound can provide a stable polymeric char formation which has useful thermal insulation effects. That the dinitrosulfanilide compound possesses stable environmental characteristics is evident from the fact that it has a low water solubility of 0.12 g/100 g water. This is in contrast to the stability characteristics of the ammonium salt of 1,4-nitroaniline-2-sulfonic acid which has a water solubility of 1.4g/100g water. Since the prior art sulfonic acid salt has demonstrated humidity stability, it would be expected that the dinitrosulfanilide component of the present composition would possess even better humidity stability.

In the preparation of the composition of the present invention, from 20% to 70 weight percent, preferably 35-60 weight percent, most preferably 55 weight percent of the dinitrosulfanilide component based on the total weight of the composition is combined with a binder system. Accordingly, the components of the binder system amount to from 80 to 30 weight percent of the intumescent agent. The binder system of the present composition must be compatible with the intumescent agent and should also have the characteristics of softening or decomposing below the activation temperature of the intumescent agent, of being processable with the intumescent agent and environmentally stable as a coating, and that the binder residue during thermal activation should contribute to the stability of the intumesced foam produced by the intumescent agent. Moreover, in order to provide a more fire resistant and thermally effective system, the binder system should be non-flammable or self-extinguishing when exposed to a flame and, upon anerobic thermal decomposition, should show no or very little exothermic behavior. A binder which satisfies these conditions is a chlorinated polyolefin of the formula:

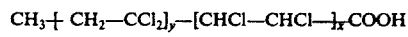

wherein the ratio $y/x$ is such that the chlorine content of the compound ranges from 58-62%. The amount of polyolefin component in the overall composition generally ranges from 15-60 weight percent. A specific example of a chlorinated olefin polymer which is useful is designated as CP-310-6 (Eastman Chemical Products, Ind.) and has the following characteristics:
1. Specific gravity (g/cc)=1.54;
2. Tukon hardness (Knoops) 20-25;
3. Vicat softening point (° C)—105;
4. Percent oxygen as carbonyl=1;
5. Glass transition (Tg)=35; and
6. Molecular weight=3000.

The binder system, in addition to having the desired fire or thermal properties, must possess desirable mechanical and physical properties. The chlorinated polyolefin binder satisfies all of the desired properties except two which are the flexibility of the binder and the low-residue stability and adhesion of the binder during thermal decomposition of the applied intumescent coating. These deficiencies can be overcome by blending a flexible epoxy resin copolymer with the chlorinated polyolefin. Suitable epoxy resins for the epoxy component of the present composition include bisphenol A types such as the bisphenol A epichlorohydrin of the formula:

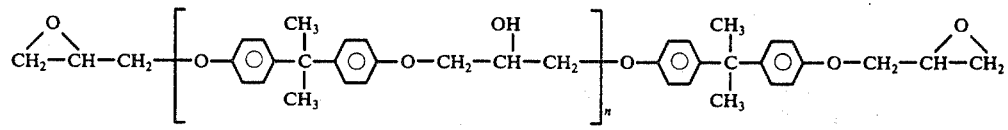

wherein $n = 1$

This material is known commercially as Epon 828 and has an average molecular of 380, an epoxide equivalent weight of 185-192 and a viscosity of 100-160 poises. The amount of epoxy component employed in the composition is that amount which is necessary to render flexibility to the resultant composition when applied to a substrate. It is not desirable to use too much of the epoxy component because it is flammable. However, some epoxy should be used because of the somewhat brittle nature of the chlorinated polyolefin. Generally, the composition contains about 0.5-2.0 weight percent epoxy.

A hardener component is necessary for the binder system in order to cross-link the epoxy resin. A rubber type amine hardener is generally used because it maintains the desired degree of flexibility in the resulting cured composition. A preferred amine hardener is an amine terminated butadiene-acrylonitrile rubber (ATBN) having the formula:

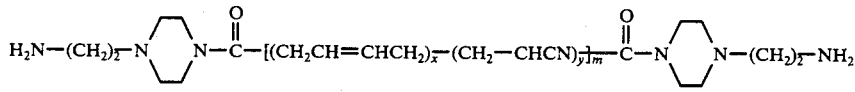

wherein $x = 5$, $y = 1$ and $, = 10$. Such an amine terminated polymer is available commercially as Hycar ATBN (1300×16), which has the following properties:
1. Brookfield viscosity at 27° C of 200,000 cps;
2. An equivalent weight based on the four amino hydrogen atoms of 840–925;
3. An acrylonitrile content of 16–18%;
4. A specific gravity of 0.938; and
5. A refractive index of 1.5172.

The amount of hardener used to react with the epoxy is that amount necessary to cure the epoxy component. Generally, a 4:1 weight ratio of hardener to epoxy is employed.

The amine-epoxy cured combination has two advantages over other systems in that the amine hardener can function as a long polymer chain for the epoxy resin resulting in a cured flexible resin. The hardener also aids in providing char stability for the epoxide. The presence of the cured epoxy polymer to the chlorinated polyolefin does not hinder or retard the intumescent process, but actually aids in providing a more stable system.

While the composition of the invention is generally and for most practical purposes prepared by blending the sulfanilide and binder components in an organic solvent, the composition can be formulated by mixing the components without a solvent. When a solvent is employed in the formulation of the composition, it is only necessary to use an amount of solvent sufficient to dissolve the solvent soluble binder constituents of the composition. Consequently, the amount of solvent used is not critical. The solubility properties of the sulfanilide component of the composition are such that it is substantially insoluble in the solvents employed. Thus, the composition is formulated as a dispersion of the sulfanilide in a solution of the binder components in a solvent. It is desirable to homogenize the dispersion as much as possible so that in the preparation of the composition, the sulfanilide and solution of epoxy and chlorinated polyolefin binder components in the solvent are generally milled in an appropriate device such as a ball mill or high speed kinetic dispersion unit. A reactive coating of the present composition is formulated which means that the sulfanilide intumescent component and epoxy and chlorinated polyolefin components are blended with or without a solvent. The amine hardener, if it is to be used in solution, is dissolved separately in a solvent. At the time of application the separately prepared sulfanilide containing dispersion and hardener solution are combined. The temperature and pressure conditions employed during formulation of the composition are not critical and generally are ambient conditions. A solvent blend is employed to insure homogeneity in dispersion of the composition and to impart sprayability to the composition. Suitable solvents include hydrocarbon solvents such as benzene, toluene, xylene, ethylbenzene, isopropylbenzene and the like and chlorinated hydrocarbons such as methylene chloride, chloroform and the like.

The present composition can be applied to any suitable substrate by any convenient means. Suitable substrates are those which do not decompose below the intumescent temperature of the present composition and include such metals as steel, aluminum and the like; plastics, wood, cardboard and the like. The present composition is therefore, especially applicable in protecting metal parts which potentially could be exposed to heat or fire such as in aircraft, spacecraft, ordnance and the like.

The intumescent composition can be applied by any satisfactory coating technique to a desired substrate e.g., by brushing, spraying, or the like. Once hardened, the coatings dry to tough adherent films which are resistant to high humidity environments. The coatings normally dry to film thicknesses of 20 to 100 mils, preferably 30 to 70 mils and when heated or exposed to fire, function as intumescent, thermal protective coatings. The coatings which are applied expand or intumesce by a factor of 10 to 30 times the original coating thickness and form a tough, uniform, insulating char or residue which protects the substrate from heat or flames. The intumescent characteristics of the present composition are initiated at a temperature of about 200° C.

Having generally described this invention, a further understanding can be obtained by reference to certain specific examples which are provided herein for purposes of illustration only and are not intended to be limiting unless otherwise specified.

PREPARATION OF 4,4'-DINITROSULFANILIDE 4,4'-Dinitrosulfanilide was prepared by the method described by E. W. Parnell in J. Chem. Soc. (1960).

EXAMPLE 1

A 26.9 parts by weight amount of 4,4'-dinitrosulfanilide, 32.9 parts by weight of chlorinated polyolefin CP-310-6, having a 60% chlorine content, 1.0 part by weight of a bisphenol A epoxy resin, Epon 828 and having an average molecular of 389 and an epoxide equivalent of 185–192 in 28.8 parts by weight of toluene were homogeneously dispersed in a pebble jar mill for 4 hours or in a high speed kinetic dispersion unit (Kady Mill dispersion unit, Model L) for 20 minutes. To the dispersion were added 10.4 parts by weight of methylene chloride to complete Mixture A of the coating composition. To Mixture A was added Mixture B which was a mixture of 4.0 parts by weight of Hycar ATBN (amine terminated butadiene-acrylonitrile) and 4.0 parts by weight of toluene.

The coating composition thus prepared is a reactive coating with a pot life of 4 to 8 hours. The solution was sprayed with a Devilbiss Type MBC, No. 96 aircap spray gun with a pressure pot of 2–3.5×10⁴ pascals (3–5 psi) and air pressure of 2.8–3.2×10⁵ pascals (40–45 psi), onto cold rolled steel substrates to a dry film thickness of 60 mils and then air dried to a tough, adherent coating. These coatings were exposed to an atmosphere of 38° C, 90% relative humidity for 150 days and then heated in an oven for 20 minutes at 1250° C to intumesce the coatings. The linear expansion of the intumesced coatings was 13 to 19 times the original thickness of the coated film which was comparable to the coatings maintained at laboratory conditions. The coatings exhibited toughness when abraded with a Taber Abrader. An average weight loss of 111 milligrams occurred when abraded with a CS-10 wheel for 1000 cycles and a 500 gram load. The coated film had a density of 1.38 g/cc.

The thermal protection afforded the substrate by the intumescent coating was determined by the combustion of a JP-4 fuel source impinging on the coating surface. (All coatings tested were air dried for one week prior to testing.) Heat at a rate of 11 to 12 × $10^4$ watts/square meter was applied to a 7.62 cm × 7.62 cm × 0.159 cm cold rolled steel panel, at the center of which was a 2.54 cm diameter hole into which was cemented (epoxy novalac/polyamide adhesive: 60/40) a 2.36 cm diameter by 0.159 cm thick cold rolled disc. Time-temperature histories of the calorimeter disc were obtained at the prescribed heating rate. An average dry coating thickness of 62 mils was used for the thermal testing.

EXAMPLE 2

Another composition in which the intumescent agent was present in a concentration of 40% was prepared by mixing 17.6 parts by weight of 4,4'-dinitrosulfanilide, 39.7 parts by weight of chlorinated polyolefin, CP-310-6, and 1.1 parts by weight of epoxy resin, Epon 828, in 30.8 parts by weight of toluene. This dispersion was prepared as described in Example 1. To the dispersion was added 10.7 parts by weight of methylene chloride to complete formulation of Mixture A of the composition. To Mixture A was added Mixture B, which comprises a mixture of 4.5 parts by weight of Hycar ATBN and 4.5 parts by weight of toluene.

The thermal protection offered by the composition was determined according to the procedure described in Example 1. An average dry coating thickness of 60 mils was used for the thermal testing.

EXAMPLE 3

Another composition in which the intumescent agent was present in a concentration of 70% was prepared by mixing 25.0 parts by weight of 4,4'-dinitrosulfanilide, 15.9 parts by weight of chlorinated polyolefin, CP-310-6 and 0.5 parts by weight of epoxy, Epon 828 in 43.1 parts by weight of toluene. The composition was prepared as described in Example 1. To this dispersion was added 15.5 parts by weight of methylene chloride to complete Mixture A of the composition. To Mixture A was added a solution designated as Mixture B consisting of 2.0 parts by weight of Hycar ATBN and 2.0 parts by weight of toluene.

EXAMPLE 4

Another composition in which the intumescent agent was present in a concentration of 20% was prepared by mixing 19.6 parts by weight of 4,4'-dinitrosulfanilide, 118.2 parts by weight of chlorinated polyolefin, CP-310-6, and 3.5 parts by weight of epoxy, Epon 828, in 224.0 parts by weight of toluene. The composition was prepared according to the procedure described in Example 1. To this dispersion was added 79.5 parts by weight of methylene chloride to complete Mixture A of the composition. Mixture B was prepared by mixing 14.2 parts by weight of Hycar ATBN and 14.2 parts by weight of toluene and the solution was added to Mixture A. The thermal protection provided by this composition was determined according to the procedure described in Example 1. An average dry coating thickness of 56 mils was used for the thermal tests.

Table 1 below shows the data obtained in the thermal tests of each of the compositions of Examples 1-4. The time in seconds required to attain the backface temperatures (temperature level on the uncoated side of the substrate) indicated were determined for each of the compositions. The table also contains comparative data from substrates coated with the intumescent coating described in U.S. Pat. No. 3,663,464 which is based upon the ammonium salt of 1,4-nitroaniline-2-sulfonic acid.

TABLE 1

| Example | Time (sec) to Reach Backface Temperature of: | | | Thickness of Applied Coating (mils) |
|---|---|---|---|---|
| | 100° C | 150° C | 200° C | |
| 1 | 50 | 110 | 170 | 62 |
| 2 | 30 | 80 | 150 | 60 |
| 3 | 20 | 50 | 80 | 43 |
| 4 | 40 | 80 | 110 | 56 |
| U.S. Pat. No. 3,663,464 | 30 | 60 | 120 | 60 |

The data in the table above substantiate that a significantly less amount of the intumescent agent of the present composition is needed to achieve the same level of thermal protection compared to the intumescent composition of the prior art which contains the ammonium salt of the nitroaniline sulfonic acid. Because of the reduced amount of intumescent agent in the present composition necessary to achieve the same level of protection afforded by the prior art composition, costs can be reduced and mechanical and environmental stability can be improved. Moreover, the range of protection offered by varying the 4,4'-dinitrosulfanilide content should permit considerable flexibility in formulating compositions of varying specific physical and thermal requirements.

EXAMPLE 5

The procedure of Example 1 was used to prepare the four compositions shown in Table 2.

TABLE 2

| Material | 5A | 5B | 5C | 5D |
|---|---|---|---|---|
| 4,4'-Dinitrosulfanilide | 9.6 | 17.6 | 26.9 | 24.9 |
| Chlorinated polyolefin | 57.7 | 39.6 | 32.9 | 15.8 |
| Epoxy | 1.7 | 1.2 | 1.0 | 0.5 |
| Toluene | 22.8 | 30.6 | 28.8 | 43.2 |
| Methylene chloride | 8.2 | 11.0 | 10.4 | 15.6 |
| | 100 | 100 | 100 | 100 |
| Mixture B | | | | |
| Amine terminated Butadiene-Acrylonitrile | 6.8 | 4.8 | 4.0 | 2.0 |
| Toluene | 6.8 | 4.8 | 4.0 | 2.0 |
| | 13.6 | 9.6 | 8.0 | 4.0 |
| Dry weight percent of intumescent agent | 20 | 40 | 55 | 70 |

Figure 2:
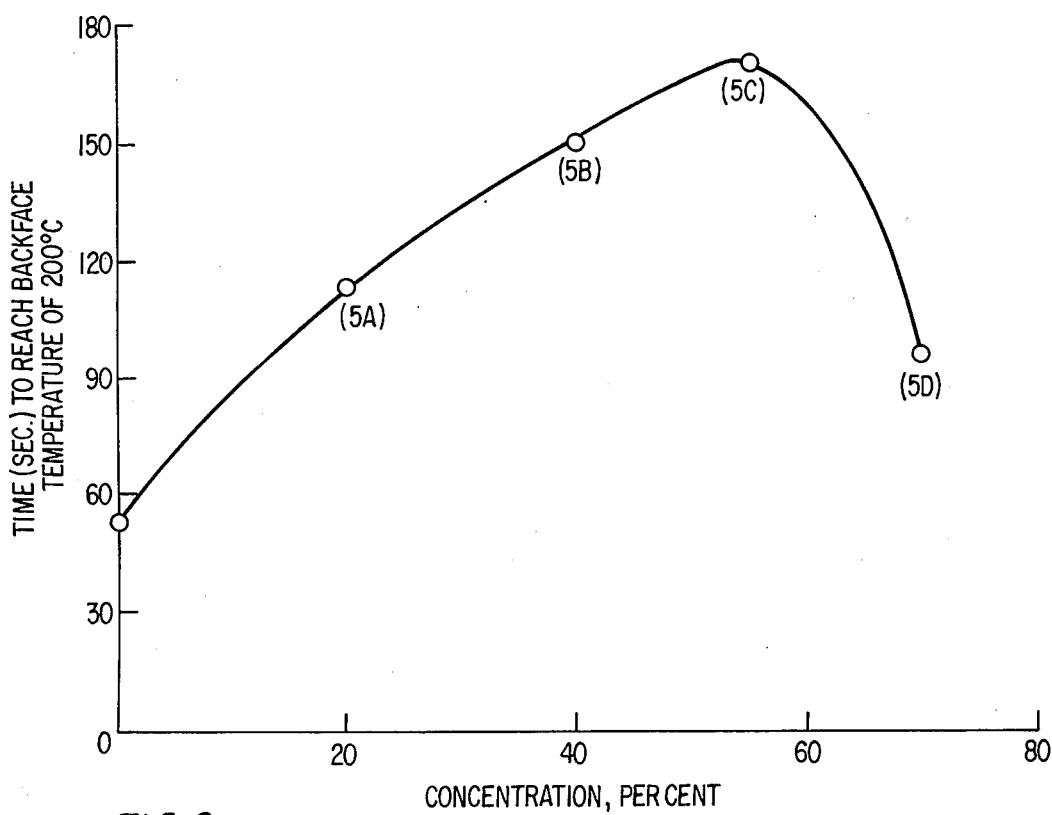
FIG. 2 is a graph showing the time to reach a backface temperature of 200° C as a function of 4,4'-dinitrosulfanilide concentration of several compositions in the scope of the present invention.

The above compositions were applied to steel substrates by the procedure described in Example 1. Each of the coated compositions was tested for backface (of the steel) thermal protection and for suitability as a film former. The results are shown in FIG. 2. Varying degrees of protection are achieved as a function of sulfanilide concentration. The sharp decrease in thermal protection above 55% sulfanilide concentration in the composition resulted because of deterioration of the char during fire tests (mechanical spalling) which was caused by an absence of binder residue in the composition. The results of this test confirm the importance of having a binder system which contributes to the formation of char during intumescence and to adhesion of the char to the substrate.

Figure 3:
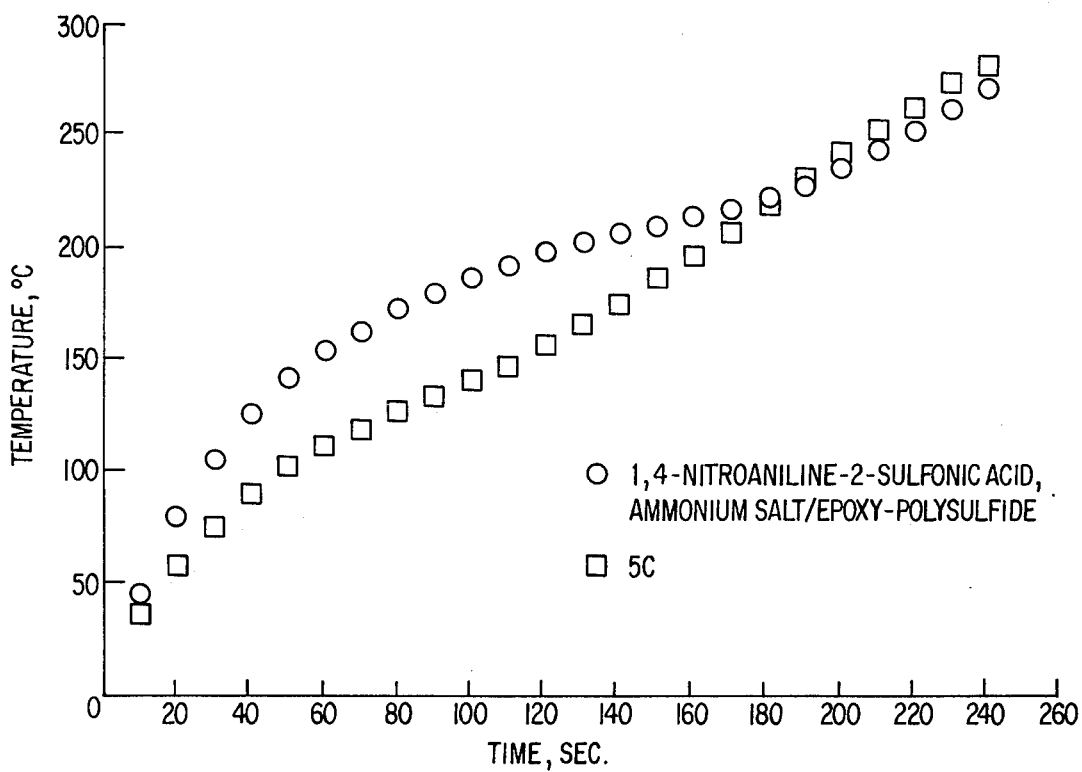
FIG. 3 is a graph of temperature versus time which shows a reduced backface temperature for a composition of the present invention compared to a conventional composition containing the ammonium salt of 1,4-nitroaniline-2-sulfonic acid.
Figure 4:
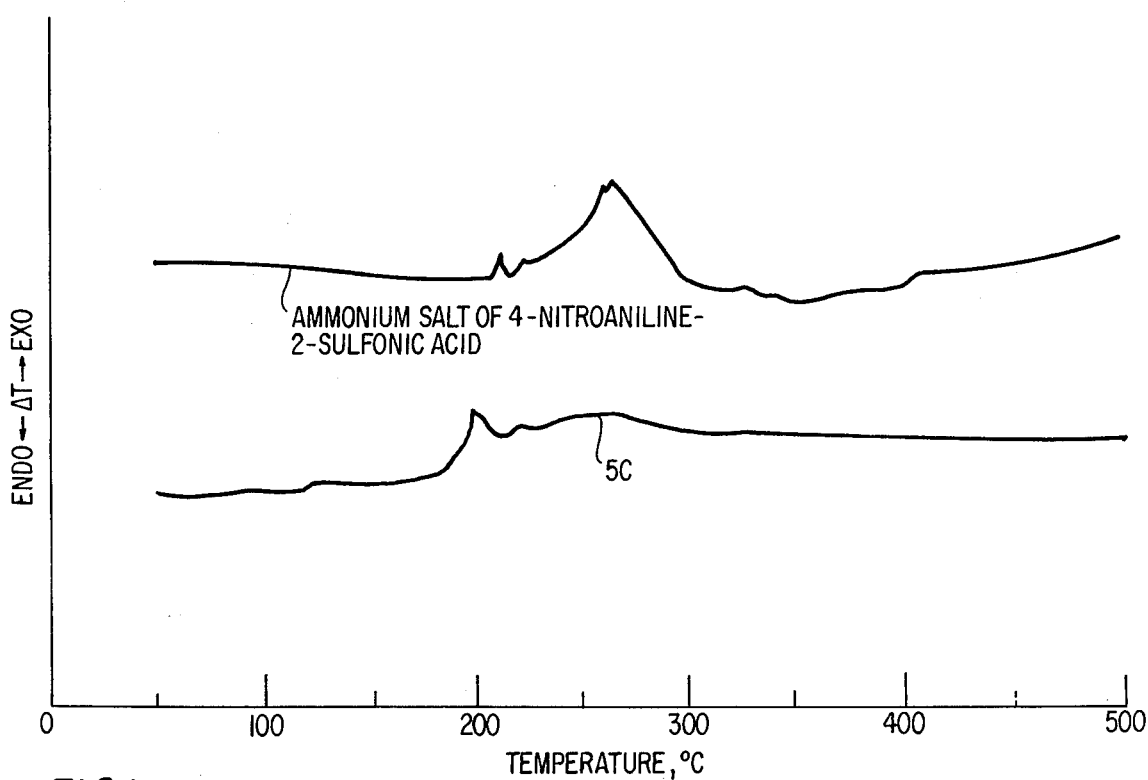
FIG. 4 is a graph showing differential thermal analysis data of a composition within the scope of the present invention and a conventional composition containing the ammonium salt of 1,4-nitroaniline-2-sulfonic acid.

The effectiveness of the dinitrosulfanilide compound of the present composition as an intumescent agent in comparison to the ammonium salt of 4-nitroaniline-2-sulfonic acid is demonstrated by the data in FIG. 3. Composition 5C of the present invention and a composition containing the ammonium salt were used. The figure shows that the present sulfanilide intumescent coating decreases the backface temperature of the substrate in the region from room temperature to 200° C at a thickness of 60 mils. The reduced backface temperature resulting from the present composition can be attributed to the lower intumescent temperature of the sulfanilide compound. The lower temperature allows foam formation to occur more rapidly thus insulating the substrate earlier. The DTA data in FIG. 4 (Ref: glass beads, scale: 2°C/in.; nitrogen atmosphere; sample weight of 50 mg) show that the lower exothermic charcteristic of the sulfanilide containing coating provides an overall improvement in the basic thermal protection afforded to substrates compared to other nitroaromatic amines, i.e., the ammonium salt of 1,4-nitroaniline-2-sulfonic acid containing coatings.

Figure 5:
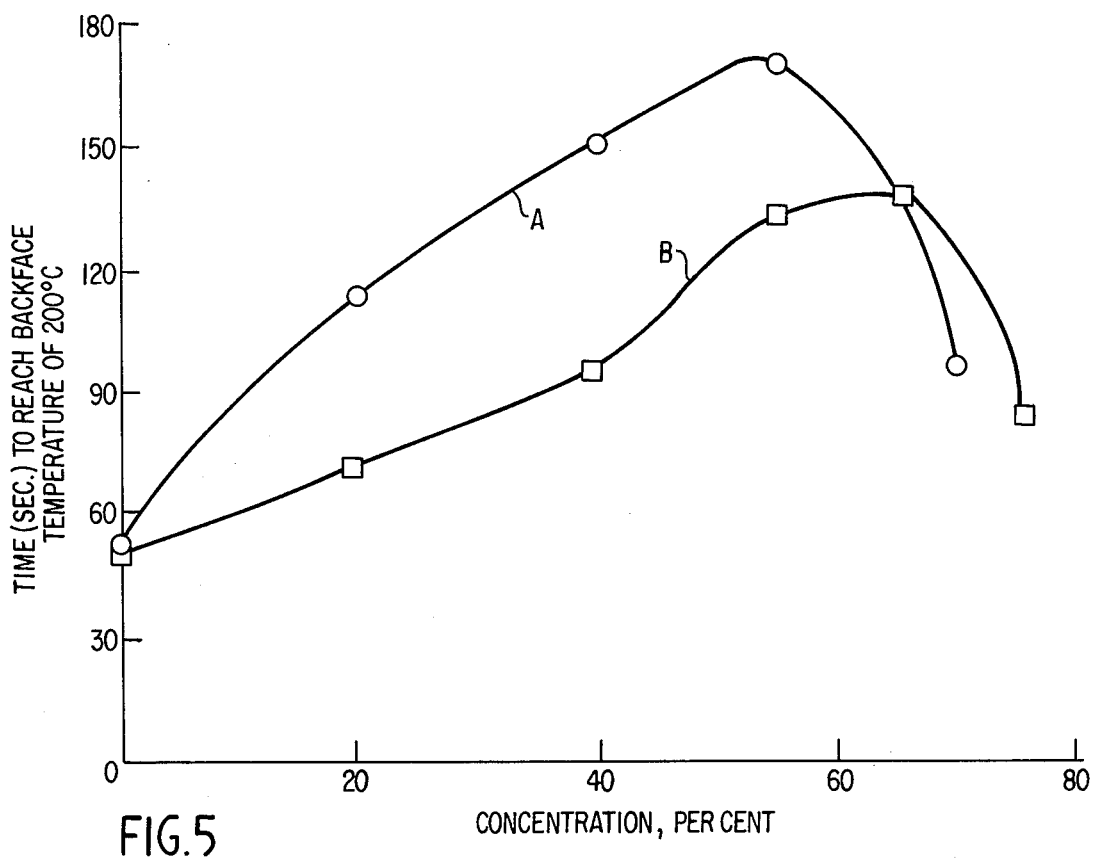
FIG. 5 is a graph which shows the time to reach a backface temperature of 200° C as a function of intumescent agent concentration in several compositions of the present invention containing the ammonium salt of 1,4-nitroaniline-2-sulfonic acid.

That the 4,4'-dinitrosulfanilide coatings of the present invention exhibit lower intumescent temperatures and possess a lower exothermic nature while maintaining thermal protection of the substrate over a broad range of compositions is evident from the data in FIG. 5. The figure compares coatings of the present composition containing various concentrations of sulfanilide (Curve A) with compositions containing the ammonium salt of 1,4-nitroaniline-2-sulfonic acid (Curve B) over the range of 20 to 75% concentration. The curves substantiate the criteria for improved thermal protection effects of the present nitroaromatic composition.

Figure 6:
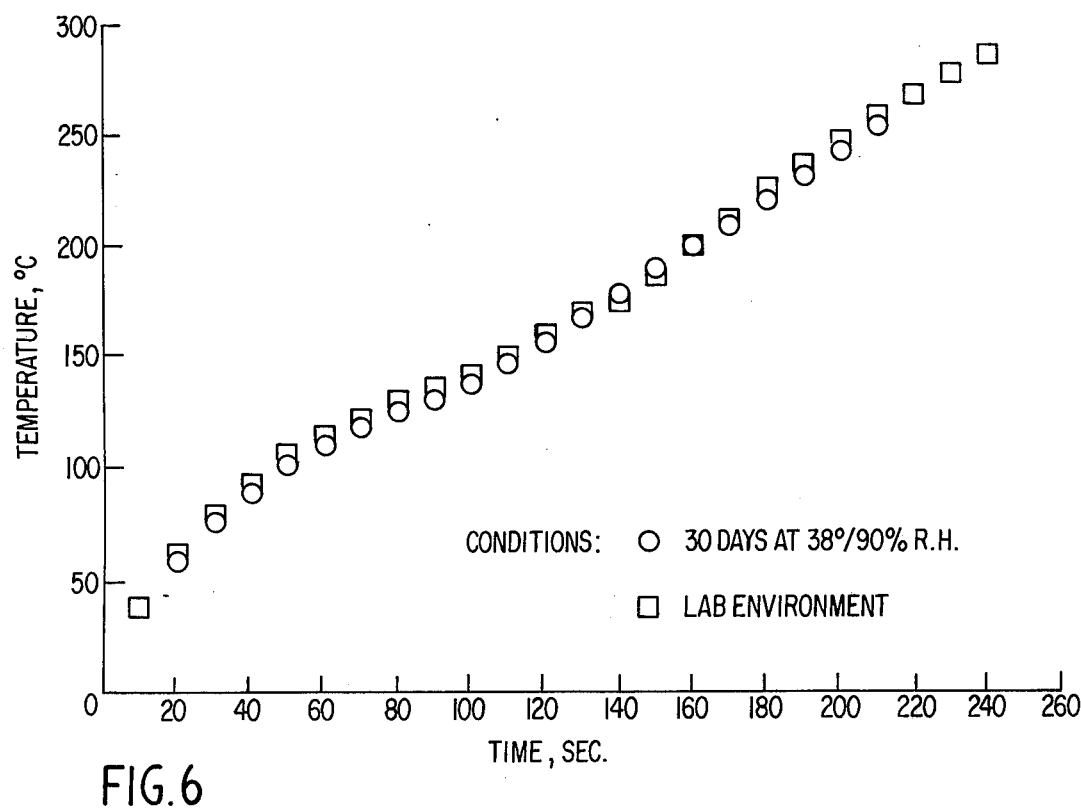
FIG. 6 shows the effect of temperature-humidity aging on the backface temperature characteristics of the sulfanilide composition of the present invention.

An important aspect of the thermal protection performance of an intumescent coating is the ability of the coating to retain its physical properties when exposed to the environmental effects of humidity or water. If the properties of the coating degrade upon exposure to the environment, adhesive failure or cracking of the coating could result which would reduce the effectiveness of the intumescent coatings. To test the environmental stability of the present composition, an intumescent coating of sample 5C on a steel substrate was subjected to an atmosphere of 90% relative humidity at 38° C for 30 days in a humidity chamber prior to subjecting the coated substrate to the thermal test with a fire from JP-4 fuel. After the coated substrate was removed from the humidity chamber, no change was observed in the appearance of the coating, e.g., swelling, erosion or brittleness. FIG. 6 shows that the temperature-humidity aging of the coated substrate did not adversely affect the thermal protection characteristics of the coating compared to the same coating composition on a substrate conditioned under standard laboratory conditions. Moreover, the thermal tests indicate that the present coating composition produces a uniform black expanded foam residue which is more resistant to thermal erosion than other conventional coatings.

The intumescent composition of the present invention also has other advantages over the composition of U.S. Pat. No. 3,663,464 in that the water solubility of 4,4'-dinitrosulfanilide (0 . . 12 g/100 g water) is less than that of the ammonium salt of 1,4-nitroaniline-2-sulfonic acid (1.4 g/100 g water) as well as of ammonium phosphate (5.0 g/100 g water). Moreover, the temperature at which intumescence or expansion begins for the present composition is lower, i.e., 200° C, than the intumescent or expansion temperature, i.e., 300° C of the prior art composition containing the ammonium salt of nitroaniline sulfonic acid. Still another advantage is that the thermal efficiency of the present composition is greater than that of the nitroaniline sulfonic acid salt containing composition as evidenced by the longer times required to achieve the same backface temperatures for coatings of the same thickness. Consequently, less weight of coating would be required for a specific thermal environment. Thus, a lesser amount of the present composition is needed to attain the same level of thermal protection or an improved level of thermal protection afforded by the prior art composition.

Having now fully described the invention, it will be apparent to one or ordinary skill in the art that many changes and modifications can be made thereto without departing from the spirit or scope of the invention as set forth herein.

What is claimed as new and intended to be secured by letters patent is:

1. An intumescent composition, which comprises:
    a mixture of 4,4'-dinitrosulfanilide as the intumescent agent in a polymeric binder mixture of a chlorinated polyolefin, a bisphenol A epoxy resin and a rubber-like amine hardener.

2. The composition of claim 1, wherein said 4,4'-dinitrosulfanilide is present in said composition in an amount of 20% to 70%.

3. The composition of claim 1, wherein said binder mixture is dissolved in an organic solvent.

4. The composition of claim 3, wherein said organic solvent is benzene, xylene, toluene or methylene chloride.

5. The composition of claim 1, wherein said chlorinated polyolefin has the structure:

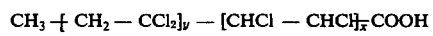

wherein the ratio of $y/x$ provides a chlorine content of 58-62 weight percent.

6. The composition of claim 1, wherein said bisphenol A epoxy has the formula:

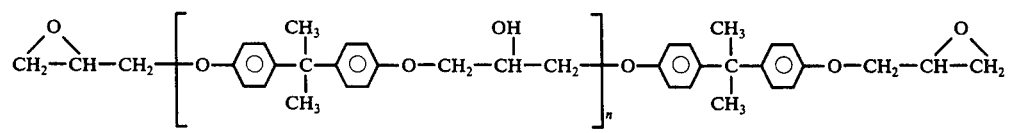

wherein $n = 1$.

7. The composition in claim 1, wherein said amine hardener has the formula:

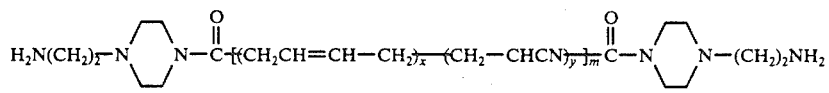

wherein $x = 5$, $y = 1$, and $m = 10$.

8. The composition of claim 1, wherein the amount of said chlorinated polyolefin in said composition ranges from 15–60 weight percent.

9. The composition of claim 1, wherein the amount of said epoxy ranges from 0.5–2.0 weight percent.

10. An intumescent composition, which comprises:

a mixture of from 20–70 weight percent of 4,4'-dinitrosulfanilide as an intumescent agent in 80–30 weight percent of a binder system of a chlorinated polyolefin having the formula:

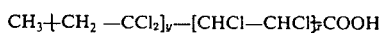

wherein the ratio of $y/x$ provides a chlorine content of 58–62 weight percent;

a bisphenol A epoxy of the formula:

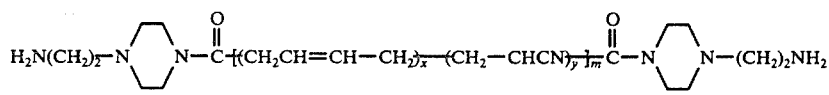

wherein $n = 1$ and an amine hardener of the formula:

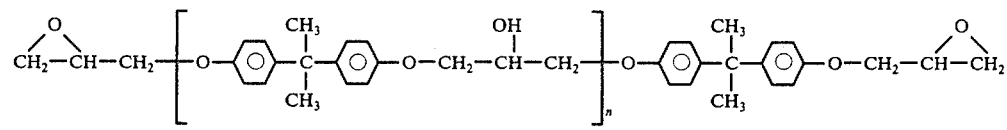

wherein $x = 5$, $y = 1$, and $m = 10$.

* * * * *